United States Patent [19]
Warner et al.

[11] 3,972,536
[45] Aug. 3, 1976

[54] ROTATING SHAFT SEAL ASSEMBLY

[75] Inventors: Dale J. Warner, Oak Lawn; Edward C. Wahl, Arlington Heights, both of Ill.

[73] Assignee: Gits Brothers Manufacturing Co., Chicago, Ill.

[22] Filed: Apr. 24, 1975

[21] Appl. No.: 571,438

[52] U.S. Cl. ............................................. 277/83
[51] Int. Cl.² ...................................... F16J 15/34
[58] Field of Search ........................... 277/81–96, 277/61

[56] References Cited
UNITED STATES PATENTS
2,839,317  6/1958  Haake................................. 277/85
FOREIGN PATENTS OR APPLICATIONS
904,256  8/1962  United Kingdom................... 277/85

*Primary Examiner*—Robert I. Smith
*Attorney, Agent, or Firm*—Hill, Gross, Simpson, Van Santen, Steadman, Chiara & Simpson

[57] ABSTRACT

A rotating shaft seal for sealing between a shaft and a housing member with a shaft carried rotating seal assembly and a housing carried stationary seal assembly both of which are full floating assemblies having at least first and second ring portions with the first ring portions of each of the assemblies being affixed respectively to the housing and the shaft and the second portions being free floating with respect to the first portions and being spring urged away from the first portions and towards each other.

7 Claims, 4 Drawing Figures

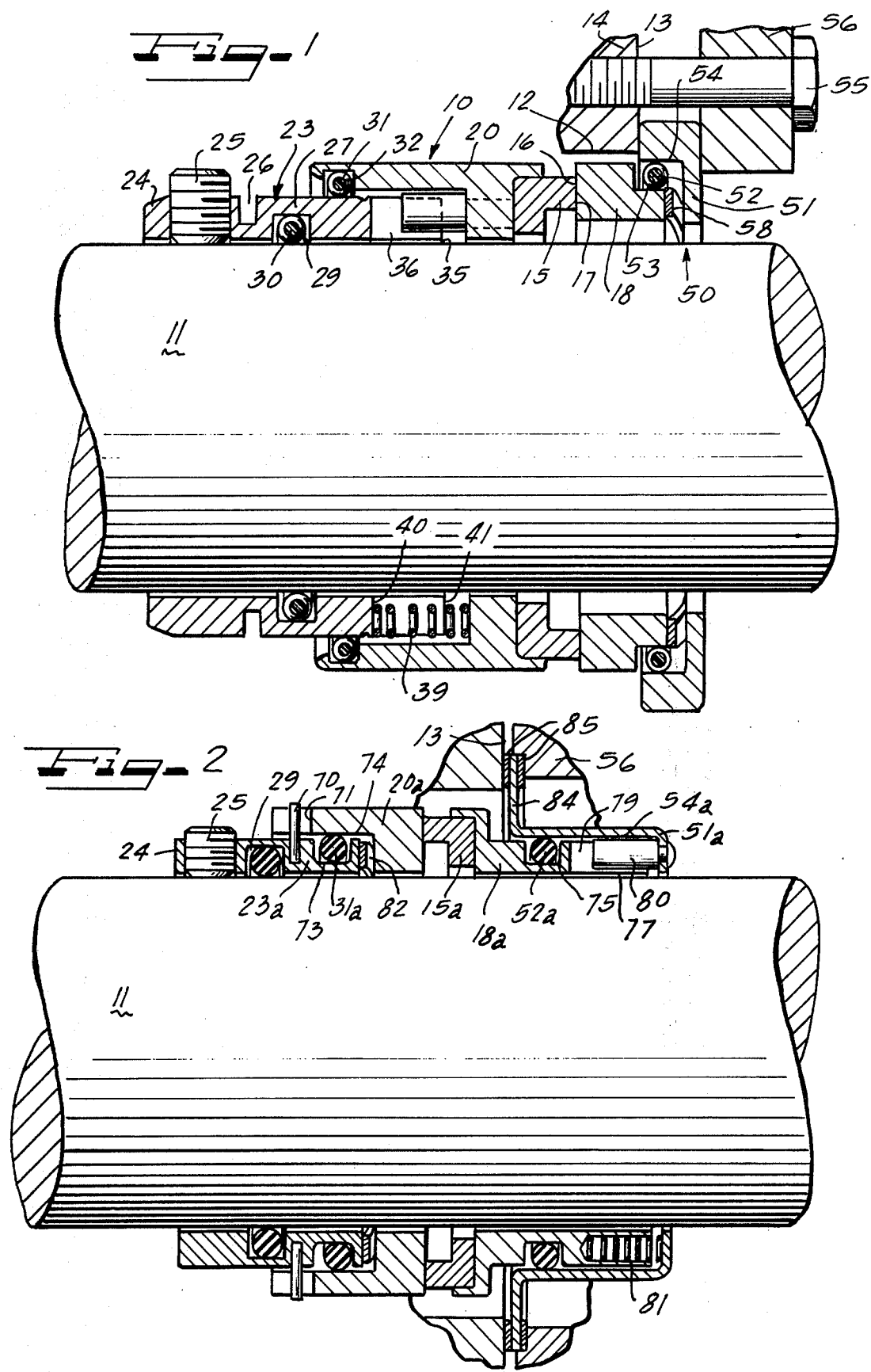

ROTATING SHAFT SEAL ASSEMBLY

BACKGROUND OF THE INVENTION

1. Field of the Invention

This invention relates to seals and more particularly to rotating mechanical shaft seals.

2. Description of the Prior Art

Rotating mating face shaft seals having a rotating seal portion attached to a shaft and a non-rotating seal portion attached to a stationary housing surrounding the shaft with a face seal interposed between the two portions are known to the art. In addition, it has been known to spring back the rotating seal portion of the assembly while attaching the stationary portion of the sealing assembly to the housing through a resilient backing. See for example U.S. Pat. No. 3,020,052 to Gits. Additionally, it has been known to isolate the connection of the rotating shaft carried portion of the seal assembly from the connection to the shaft and to provide a floating face seal. See for example U.S. Pat. No. 3,420,535 to Hershey or U.S. Pat. No. 3,765,689 to Adams. Such special embodiment constructions have been created in an attempt to overcome face distortion at the interface of the seal. For example, the seal face can be distorted through the effect of the clamping operation which enclamps the seal face member to either the shaft or the housing. Attempts to avoid this distortion have led to the separation of the seal face carrying member from the enclamping member. Additionally, it has been known to attempt to provide for the establishment of a seal face perpendicular to the shaft by floating the seal face with respect to the shaft.

Such prior art attempts to eliminate seal interface problems have not been entirely successful, either because they have not sufficiently isolated the seal from the enclamping force or because they have not adequately provided for full float at the interface. In addition, seal face distortion is increased because of the necessity to urge the mating faces together with a pressure sufficient to prevent leakage. When this has been done, in the past, any distortion or non-perpendicular relation between the mating faces and the shaft or between the mating faces themselves has required an increase in spring force. The increase in spring force can, in certain embodiments, have an extremely disadvantageous effect upon both the life and performance of the seal as well as an additive effect to the distortion problem itself.

It would therefore be an advance in the art to provide a fully floating mechanical shaft seal where the main seal face is entirely free of clamping distortions while being equally free to align itself perpendicularly to the shaft.

SUMMARY OF THE INVENTION

Our invention improves upon the prior art seals and provides a mechanical mating face shaft seal wherein both the stationary and rotating sides of the seal are formed of first and second seal ring portions, the first portions being attached respectively to the shaft and the housing and the second portions carrying the mating primary seal faces, the second portions both being spring urged away from the first portions and towards one another at the interface. The connections between the first and second portions allow the second portions to float with respect to the first portions.

In a preferred embodiment, the springs urging the second portions towards one another are balanced with respect to one another so that neither spring will be entirely compressed during operation. The use of a fully floating connection together with the dual springs not only eliminates any clamping stress caused either by the clamping to the shaft or the clamping to the housing but also allows both the shaft carried seal portion and the housing carried seal portion to achieve a perpendicular relationship to the shaft even when the shaft is not perpendicular to the housing clamped portion. In addition balancing the springs allows the assembly to move axially in unison to accommodate shaft axial run-out during operation and allows the seal assembly to "work" until it achieves a perpendicular position.

Secondary seals, normally o-ring type seals, are provided between the first and second portions on each side of the seal assembly.

It is therefore an object of this invention to provide an improved mating face mechanical shaft seal assembly wherein both the rotating and non-rotating portions of the main seal are fully floating.

It is another and more important object of this invention to provide a mechanical shaft seal having a primary seal at an interface between rotating and non-rotating portions of the seal assembly, the rotating portion being driven by the shaft and being fully floating in relation thereto, the non-rotating portion being carried by a housing and being in fully floating relation to the housing and shaft, portions of the non-rotating and rotating portions being spring urged towards one another.

It is another and more specific object of this invention to provide a mechanical shaft seal assembly having a primary seal at an interface between a primary seal ring and a mating face ring, one of which is carried by a rotating seal portion and the other of which is carried by a non-rotating seal portion, the rotating seal portion consisting of first and second portions, the first portion being carried by the shaft for rotation therewith, the second portion being fully floating with respect to the first portion and shaft and being rotatably driven by the first portion, a spring interposed between the first and second portions of the rotating portion, the stationary portion consisting of first and second portions, the first portion being affixed to a housing member, the second portion being fully floating with respect to the first portion and the shaft with means interposed between the first and second portions of the stationary portion restricting rotation of the second portion with respect to the shaft and housing and spring means interposed between the first and second portions of the stationary portion, the spring means urging the first portions of both the stationary and rotating portions towards one another at the interface of the primary seal ring and the mating face ring.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a fragmentary cross sectional view of a mechanical shaft seal according to this invention.

FIGS. 2 through 4 are similar to FIG. 1 showing modified forms of the shaft seal assembly of this invention.

DESCRIPTION OF THE PREFERRED EMBODIMENTS

Figure 3:
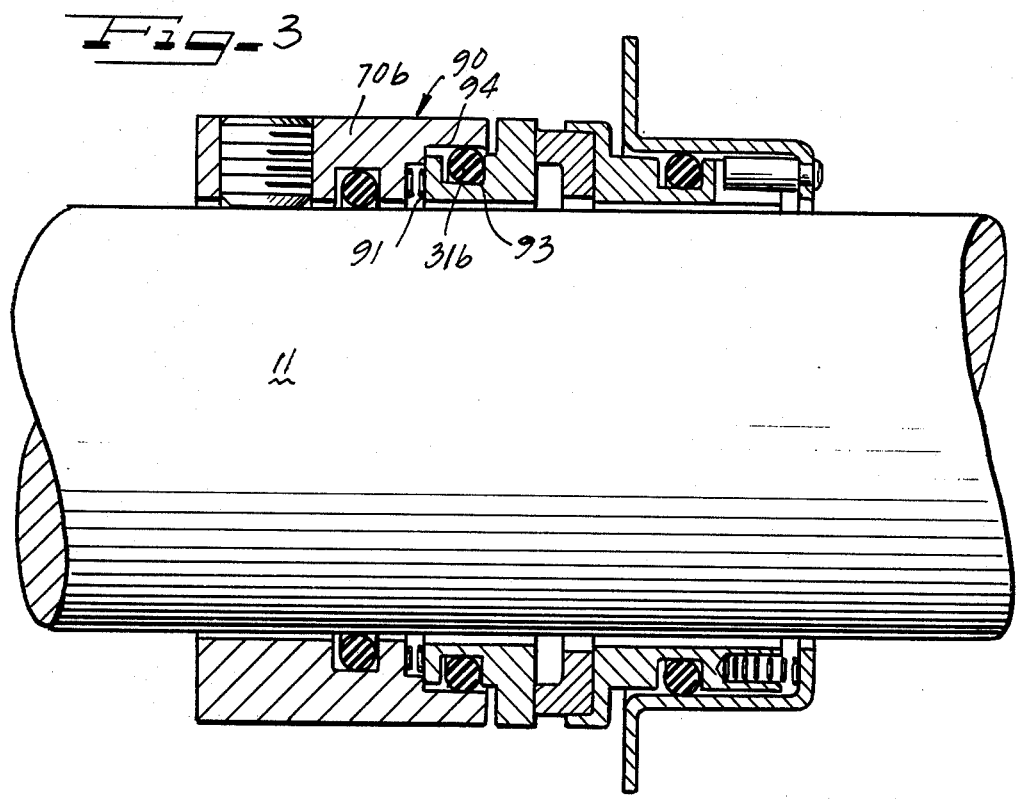

FIG. 1 illustrates a shaft seal assembly 10 received around a shaft 11 which projects through an opening 12 in the end wall 13 of a housing 14, the majority of the housing being broken away in the view.

The seal assembly includes a primary seal ring 15 having a sealing face 16 which rides in axial abutment against a mating face 17 of a stationary ring portion. In the embodiment illustrated in FIG. 1, the primary seal ring 15 is carried by a second rotating seal ring portion 20 while the mating face 17 is formed as a part of a second stationary seal ring portion 18.

A first rotating seal ring portion 23 is received around the shaft 11 and has an axial end 24 fastened to the shaft by means such as set screws 25. A radial groove 26 extends into the first rotating seal ring portion 23 intermediate the ends thereof and provides a stress relieving groove which helps isolate a major portion 27 of the axial length of the first rotating seal ring portion from clamping stresses caused by enclamping the end 24 to the shaft. An inner diameter groove 29 receives a secondary seal 30 in sealing engagement with the bottom wall of the groove 29 and with the surface of the shaft. In the embodiment illustrated, the secondary seal 30 consists of a coated o-ring of the type presently commercially available and known as Vanway O-rings. The coating may be of any desired type, and can include for example rubber o-rings coated with teflon (a registered trademark of I. E. du Pont de Nemours & Co. for a brand of tetrafluoroethylene).

The first rotating seal ring portion 23 radially underlies a portion of the second rotating seal ring portion 20 and a further secondary seal 31 is received in a groove 32 in the inner diameter of the second rotating seal ring portion with the seal ring 31 sealing both against the bottom of the groove 32 and against the outer diameter of the first rotating seal ring portion 23.

An axial end face 35 of the first rotating seal ring portion 23 opposite the end 24 has a series of slot openings 36 therein which receive drive lugs 37 which are affixed to and carried by the second rotating seal ring part 20. The drive lugs 37 are received in only some of the slots 36 with springs 39 received in other of the slots. The drive lugs and springs may alternate or the springs may predominate around the circumference of the seal assembly. The springs 39 bottom against the back wall 40 of the slots 36 and against a radial wall 41 of the second rotating seal ring portion 20.

It can therefore be seen that the primary seal ring 15 is carried entirely by the second rotating seal ring portion 20 which in turn is driven by the lugs 37 by the shaft through the enclampment of the first rotating seal ring portion 23 to the shaft. However since the only connection between the first rotating seal ring portion and the second rotating seal ring portion is through the lugs 37, the springs 39 and the secondary seal 31, the second rotating seal ring portion is substantially fully floating on the shaft and the seal face 16 of the primary seal ring will be fully free of any clamping stress which could otherwise be transmitted thereto by the enclampment of the rotating seal ring assembly to the shaft. It should further be noted that the seal line of the secondary seal 31 with the first rotating seal ring portion is at an approximately equal radial distance from the center of the assembly as is the radial center of the primary seal face 16. Thus the seal is axially balanced with both the primary and secondary seals being located such that they will be pressure balanced. It is desirable to pressure balance both the primary and the secondary seals so that sealed pressure acts against both seal faces at substantially equal levels and on substantially equal areas. By positioning the center line of the primary seal face on an axial line with the seal face of the secondary seal, the seals will be substantially pressure balanced.

The spring 39 acts to urge the entirety of the second rotating seal ring portion towards the stationary seal assembly 50, which consists of a second stationary seal ring portion 18 and a housing clamping portion or first stationary seal ring portion 51. The second stationary seal ring portion may be formed of a material which is compatible with the primary seal 15. For example, the portion 18 could be constructed of a ceramic or it could be a metal with a coated face 17. In numerous embodiments, the primary seal member 15 will be a graphite member.

A secondary seal member 52 is interposed between a ledge face 53 of the second stationary seal ring portion 18 and an axial face 54 of the first stationary seal ring portion 51. The seal face of the secondary seal 52 also lies on an axial line with the center portion of the primary seal face and of the secondary seal 31. The stationary seal assembly is enclamped to the housing by means of a bolt 55 and a clamping member 56. In the embodiment illustrated in FIG. 1, rotation of the second stationary seal ring portion 18 is prevented by friction contact through the secondary seal 52. A wave spring 58 is interposed between a radial wall of the first stationary seal ring portion 51 and a radial wall of the second stationary seal ring portion 18. The wave spring 58 urges the second stationary seal ring portion 18 towards the primary seal ring 15. In the preferred embodiments, the springs 39 and the spring 58 are balanced with respect to one another or at least are of a strength sufficient to insure that neither spring will be fully compressed when the assembly reaches an axial equilibrium. In this manner both of the second seal ring portions 20 and 18 are fully axially movable with respect to their associated first portions and, as can be seen, both are fully floating radially. By using springs which urge the second seal ring portions towards one another at the seal interface, the entire seal assembly will find its own axial equilibrium. In addition during axial movement of the shaft, as sometimes occurs, the springs will allow the primary seal to maintain adequate contact. The secondary seals 52 and 31 are preferably chosen so as to minimize the seal created drag allowing freedom of axial movement while maintaining an adequate secondary seal.

By balancing the springs of the rotating and stationary seal assemblies the entire seal assembly will "work" to achieve a stable position in which the primary seal interface will be perpendicular to the shaft. When the stationary seal face is not at a right angle to the center line of rotation of the seal assembly the rotating portion will wobble with each rotation as its spring attempts to maintain a full face seal. By floating both sides and by balancing the springs, this wobble will cause axial movement of both the rotating and stationary assemblies. Since the overall assembly will attempt to conserve energy by doing the least amount of work, the axial movement necessary to accommodate the wobble will cause the assembly to "work" itself to a position in which wobble is eliminated. This will occur when the seal interface is perpendicular to the center line of rotation. It is to be understood that when we refer to the seals as being balanced, this means that even though the springs may have different strengths and/or spring rates, somewhere within their axial lengths a balance will be achieved without either spring being bottomed.

Figure 4:
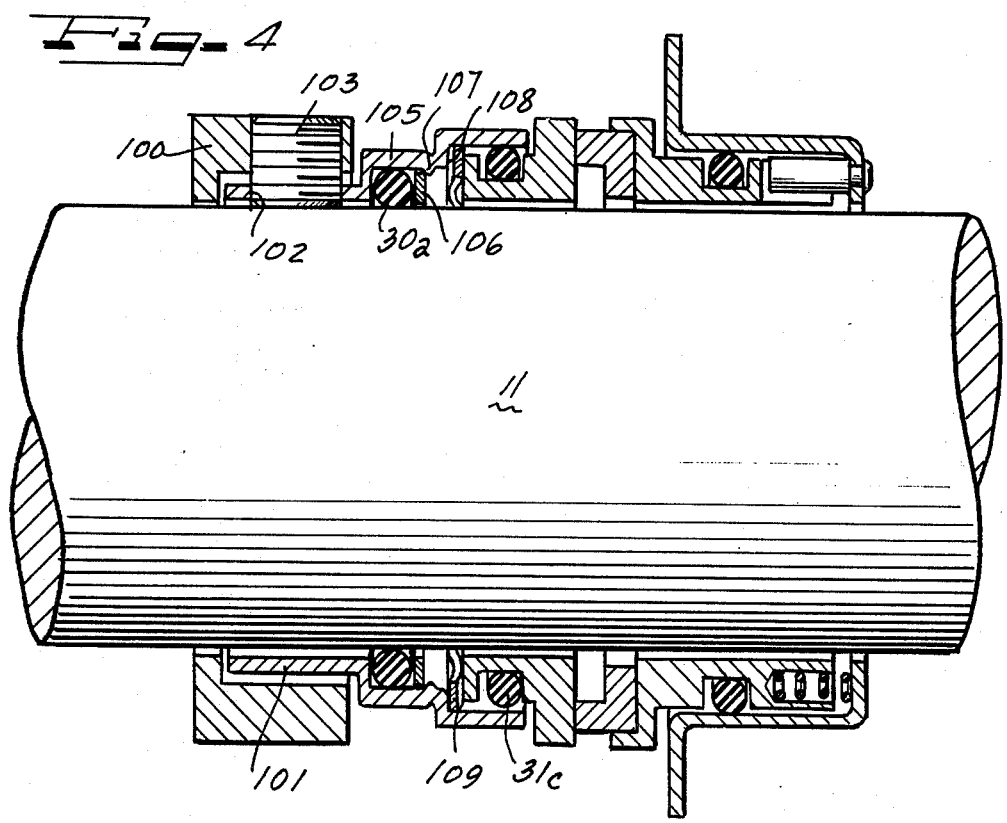

FIGS. 2 through 4 show modified forms of the seal assembly described in FIG. 1 with like parts numbered similarly.

In the embodiment illustrated in FIG. 2, the second rotating seal assembly portion 20a comprises the mating face of the primary seal with the primary seal ring 15a carried by the second stationary seal ring portion 18a. In this embodiment, the first rotating seal ring portion 23a is again clamped to the shaft 11 by set screws 25 adjacent an end portion 24. However instead of the stress relieving groove 26, the secondary seal groove 29 is positioned closer to the set screws and the axial length of the first rotating seal ring portion is considerably less than in the embodiment of FIG. 1. A series of radially directed locking pins 70 extend outwardly into engagement with notches 71 formed in an axial end of the second rotating seal ring portion 20a. The secondary seal 31a between the first and second rotating seal ring portions is received in a groove 73 in the first rotating seal ring portion and seals against an axial wall 74 of the second rotating seal ring portion, the axial wall 74 being substantially aligned with the center of the radial width primary seal face. The second stationary seal ring portion 18a has a radial groove therein 75 which receives the secondary seal 52a which seals against an axial face 54a of a sheet metal first stationary seal ring portion 51a. An end portion 77 of the second stationary seal ring portion is notched as at 78 and receives locking pins 80 carried by the first stationary seal ring portion to prevent rotation of the second stationary seal ring portion. Some of the notches have springs 81 received therein urging the second stationary seal ring portion towards the second rotating seal ring portion 20a. A wave spring 82 received between the first and second rotating seal ring portions urges the second rotating seal ring portion towards the second stationary seal ring portion. A radially extending flange 84 of the sheet metal first stationary seal ring portion 51a is enclamped between seal gaskets 85 and the housing 13 and clamping ring 56. Again the secondary seals are substantially axially aligned with the radial midpoint of the primary seal face.

In the embodiment illustrated in FIG. 3 the stationary seal assembly is substantially the same as that illustrated in FIG. 2, however the rotating seal assembly 90 is slightly modified with the first rotating seal ring portion 20b being radially more massive and with coil springs 91 received between the first and second rotating seal ring portions. In this embodiment, rotation of the second rotating seal ring portion is assured by the friction of the secondary seal 31b which is received in a radially outwardly opening groove 93 in the second rotating seal ring portion and which seals against an axial wall 94 of the first rotating seal ring portion which overlies portions of the second rotating seal ring portion.

In the embodiment illustrated in FIG. 4, the stationary seal assembly and the second rotating seal ring portion are substantially the same as illustrated in FIG. 3, however the first rotating seal ring portion is formed of sheet metal and also floats in relation to the shaft. A locking collar 100 has an axially extending portion which overlies an axially extending portion 101 of the first rotating seal ring portion. The portion 101 has openings 102 therethrough which receive a set screw 103 which extends from the locking collar to the shaft. The diameter of the openings 102 is greater than the diameter of the set screw 103, at least in an axial direction, and preferably both axialy and circumferentially. In this manner, although the first rotating seal ring portion is effectively held to the shaft, it is held in a non-enclamping manner which will allow it to float both radially and axially. The seal 30a is received in a groove formed by a ledged portion 105 of the first rotating seal ring portion and by a ring washer 106 which is held in place by a dimple 107 impressed radially inwardly. A second ledge 108 forms a radial wall serving as a backing for a wave spring 109 which is entrapped between the ledge 108 and the second rotating seal ring portion. This embodiment has numerous advantages including the fact that by allowing the first rotating seal ring portion to float with respect to the shaft, the primary seal will be totally free of any clamping stresses. Of course it should be understood that although FIG. 4 illustrates the second rotating seal ring portion as comprising the mating face, it could comprise or carry the primary seal ring with the second stationary seal ring portion including or carrying the mating face.

In addition, because of the use of a stamped metal ring to form the first rotating seal ring portion, there is considerably less mass. Again, in the embodiment illustrated, rotational drive of the second rotating seal ring portion is through the secondary seal ring 31c. However, if desired, drive lugs or other drive means can be used.

Although the teachings of our invention have herein been discussed with reference to specific theories and embodiments, it is to be understood that these are by way of illustration only and that others may wish to utilize our invention in different designs or applications.

We claim as our invention:

1. A mechanical shaft seal comprising a stationary seal assembly and a rotating seal assembly, the stationary seal assembly having first and second stationary seal ring portions received around a shaft with a spring means interposed therebetween urging the second stationary seal ring portion away from the first stationary seal ring portion and towards the rotating seal assembly, the rotating seal assembly including first and second rotating seal ring portions with spring means therebetween constantly urging the second rotating seal ring portion away from the first rotating seal ring portion and towards the stationary seal assembly, a primary seal at an interface between the second rotating seal ring portion and the second stationary seal ring portion, secondary seals between the first and second rotating seal ring portions and the first and second stationary seal ring portions, means limiting rotation between the first and second rotating seal ring portions and between the first and second stationary seal ring portions, the first and second rotating seal ring portions received around the shaft with locking means attaching the first rotating seal ring portion to the shaft to rotation therewith, the first stationary seal ring portion being attached to a housing which receives the shaft, the attachment of the first stationary seal ring portion of the housing preventing rotation of the first stationary seal ring portion.

2. The seal assembly of claim 1 wherein additional seal means is provided between the first rotating seal ring portion and the shaft.

3. In a mechanical shaft seal having a stationary seal assembly carried by a housing and a rotating seal assembly carried by a shaft received through the housing with a primary seal at an interface between the stationary and rotating seal assemblies, the improvement of both of said seal assemblies comprising two portions with a first portion of the rotating seal assembly carried by the shaft for rotation therewith and a first portion of the stationary seal assembly carried by the housing through a non-rotatable connection, the interface being between second portions of the rotating and stationary seal assemblies, spring means between the first portions and second portions of each of the seal assemblies, the spring means constantly urging the second portions of the assemblies towards one another at the interface and secondary seals between the first and second portions of each seal assembly, the second portions of both of said seal assemblies floating with respect to the shaft.

4. The mechanical shaft seal of claim 3 wherein the secondary seals are substantially axially aligned with the primary seal.

5. The mechanical shaft seal of claim 3 wherein the spring means are balanced with respect to one another whereby the seal assemblies will seek and axial equilibrium at a point where neither of the spring means are fully compressed.

6. A mechanical shaft seal comprising rotating and nonrotating seal assemblies with a primary seal at a radial interface between the assemblies, each of the assemblies consisting of first and second ring portions the first portions connected respectively to the shaft for rotation therewith and to the housing by means of a connection preventing rotation, the second portions being substantially free floating with respect to the first portions, secondary seals between the first and second portions, spring means between the first and second portions constantly urging the second portions axially towards one another, the spring means being balanced whereby the seal assemblies will find an axial equilibrium at a point where neither of the spring means is fully compressed, drive means between the first and second portions of the rotating seal assembly, rotation preventing means between the first and second portion of the stationary seal assembly, the primary seal including a primary seal ring carried by one of the second portions and a mating face carried by the other of the second portions.

7. A mechanical shaft seal comprising rotating and non-rotating seal assemblies with a primary seal at a radial interface between the assemblies, each of the assemblies consisting of first and second ring portions the first portions connected respectively to the shaft for rotation therewith and to the housing by means of a connection preventing rotation, the second portions being substantially free floating with respect to the first portions, secondary seals between the first and second portions, spring means between the first and second portions urging the second portions axially towards one another, the spring means being balanced whereby the seal assemblies will find an axial equilibrium at a point where neither of the spring means is fully compressed, drive means between the first and second portions of the rotating seal assembly, rotation preventing means between the first and second portion of the stationary seal assembly, the primary seal including a primary seal ring carried by one of the second portions and a mating face carried by the other of the second portions, the connection of the first portion of the rotating seal to the shaft includes a locking collar received around the shaft having a portion overlying an axial length of the first portion, screw means passing through threaded openings in the portion of the locking collar and through non-threaded openings in the axial length, the non-threaded openings being larger than the screw means whereby the first portion of the rotating seal assembly is at least partially floating on the shaft, and secondary seal means between the first portion and the shaft.

* * * * *